United States Patent [19]

Stratienko

[11] 4,097,167
[45] Jun. 27, 1978

[54] THRUST COLLAR

[76] Inventor: Andrew Stratienko, 8503 Elliston Dr., Philadelphia, Pa. 19118

[21] Appl. No.: 775,174

[22] Filed: Mar. 7, 1977

[51] Int. Cl.$^2$ .............................................. B25G 3/20
[52] U.S. Cl. ..................................... 403/374; 403/370
[58] Field of Search ............................ 403/370–376, 403/13, 14, 356

[56] References Cited

U.S. PATENT DOCUMENTS

| 3,434,303 | 3/1969 | Leyer | 403/370 X |
| 3,501,183 | 3/1970 | Stratienko | 403/370 |
| 3,638,974 | 2/1972 | Stratienko | 403/370 X |
| 3,776,651 | 12/1973 | Peter et al. | 403/370 X |
| 3,847,495 | 11/1974 | Peter et al. | 403/370 |
| 3,849,015 | 11/1974 | Peter et al. | 403/370 |
| 3,958,888 | 5/1976 | Mullenberg | 403/13 |
| 3,972,636 | 8/1976 | Peter et al. | 403/374 |
| 3,998,563 | 12/1976 | Kloren | 403/374 |
| 4,025,213 | 5/1977 | Schafer | 403/370 |

FOREIGN PATENT DOCUMENTS

| 2,204,038 | 8/1973 | Germany | 403/370 |
| 2,429,741 | 1/1976 | Germany | 403/370 |

Primary Examiner—Wayne L. Shedd

[57] ABSTRACT

Disclosed is a thrust retaining device for positive axial securing of a part on a smooth shaft or within a smooth bore without shoulders, threads, grooves or holes. The thrust retaining device for use on a shaft includes a contractible inner collar ring for retaining thrust by having one end positioned against the part to be secured, an outer collar ring to be placed over the inner collar ring for contracting it, and loading screw means attached to the outer ring for applying axial force to the outer ring. The inner ring has an inner surface for gripping the shaft when contracted and an outer surface which is axially inclined at a shallow angle and matches an axially inclined inner surface of the outer ring. At least one of the axially inclined surfaces of the inner ring and outer ring is coated with a stable anti-friction material preventing metal-to-metal contact at static pressure. The shallow angle of the inclined surfaces and the slippery anti-friction material offer less resistance to axial sliding of the outer ring on the inner ring than sliding of the inner ring on the shaft. Therefore, axial force applied to the outer ring in the direction of angle inclination causes contraction of the inner ring and gripping of the shaft.

11 Claims, 4 Drawing Figures

U.S. Patent    June 27, 1978    4,097,167
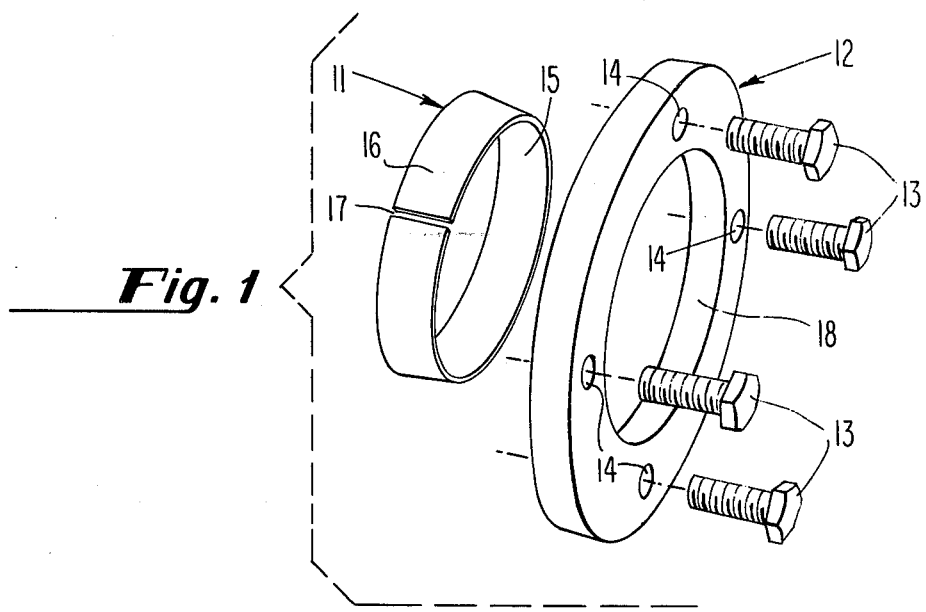
*Fig. 1*
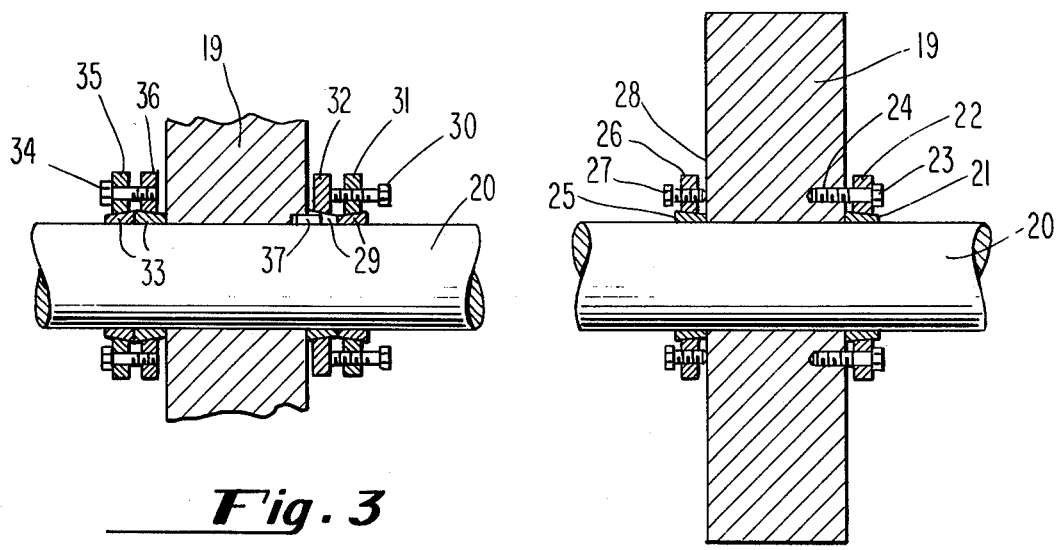
*Fig. 3*
*Fig. 2*
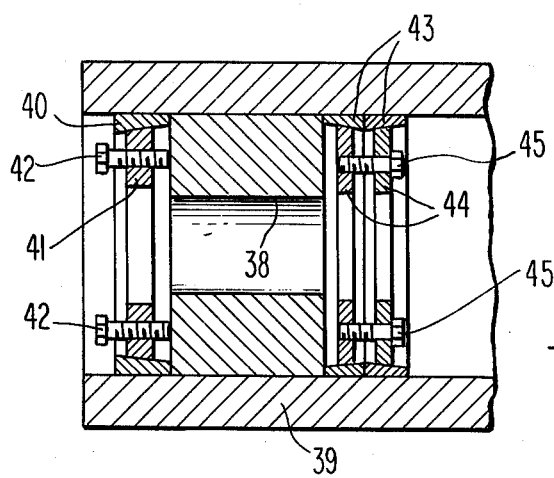
*Fig. 4*

THRUST COLLAR

BACKGROUND OF THE INVENTION

There are numerous cases in the mechanical arts where thrust retaining is desired on a shaft or within a bore. One common example is the anchoring or axial securing of parts such as gears, cams, bearings, pulleys and the like on a shaft or within a bore.

Various devices employed in the past to axially secure parts on shafts or within bores include threaded portions, machined shoulders, circumferential grooves and snap rings, drilled holes for inserting pins, and special keys. These devices have the disadvantages of requiring extra machining operations on the shaft or within the bore, difficulty in removing the devices, and inability to change the position of the thrust retaining device on the shaft or within the bore. One thrust retaining device employed in the past which avoids these disadvantages is a collar provided with a set screw, however, it does not have the ability to retain a high thrust force.

SUMMARY OF THE INVENTION

It is an object of the invention to provide a thrust retaining device for positive axial securing of a part on a shaft or within a bore which avoids the above-stated disadvantages of the prior art and is capable of retaining high thrust force.

The invention is a thrust collar comprising, in the embodiment for use on a shaft, a contractible inner collar ring to be placed on the shaft and for retaining thrust by having one end positioned against the part to be secured, an outer collar ring to be placed over the inner collar ring for contracting it, and loading screw means attached to the outer collar ring for applying axial force to the outer ring to move the outer ring axially with respect to the inner ring. The adjacent surfaces of the inner and outer rings are axially inclined to cause contraction of the inner ring and gripping of the shaft when the outer ring slides on the inner ring. In the embodiment for use within a bore, the outer ring and inner rings reverse their roles, and the outer ring is expandible to grip the inside surface of the bore and provide the thrust retention.

The invention employs the principles described in U.S. Pat. No. 3,501,183, issued Mar. 17, 1970, to Andrew Stratienko. That patent, which is herein incorporated by reference, describes a self-interlocking wedge device featuring a circular (or other closed cross section shape) flexible member which has an axially or longitudinally straight inner surface for placement on a shaft or the like and an axially tapered or inclined outer surface for engaging a similarly inclined inner surface of another circular member which is placed over the first member. At least one of the inclined surfaces has a very low coefficient of friction due to a coating of stable dry anti-friction material preventing metal-to-metal contact at high static pressure. Examples of satisfactory coatings are polytetrafluoroethylene (Teflon), molybdenum disulphide, tungston disulphide, graphite, chrome plate, silver plate, and silver plate impregnated by a soft metal such as indium.

The straight inner surface of the inner member and the surface of the shaft upon which it is positioned have a much higher coefficient of friction due to having no anti-friction material on either. (In the embodiment for use within a bore, the straight outer surface of the outer member is positioned against the inside surface of the bore). The taper angle or angle of inclination and the coefficients of friction for the inclined surface and for the straight surface are interrelated so that the outer member can be moved axially with respect to the inner flexible member in the direction of taper inclination and the inner member will not move axially on the shaft, due to the greater resistance to relative sliding, but rather will be contracted tighter around the shaft, which further increases resistance to axial movement on the shaft. The required relationship to achieve this result is as follows:

$$f > \tan(\alpha + \phi)$$

where:

$f$ is the coefficient of starting friction of the inner member on the surface of the shaft.

$\alpha$ is the angle of inclination of the axially inclined surface with respect to the axis, and $\phi$ is the frictional angle of the axially inclined surface, the coefficient of starting friction of the axially inclined surface being $\tan \phi$.

The above-stated principle is incorporated into the present invention with improvements to provide a thrust collar which avoids the disadvantages of prior art thrust retaining devices. The inner collar ring has an inner surface for gripping the outer surface of the shaft, an outer surface which is axially inclined, and an end surface or face for positioning against the part to be secured on the shaft to thereby retain thrust and axially secure the part. The outer collar ring has an inner surface which is axially inclined at the same angle as the outer surface of the inner ring for engaging that surface. The inner ring and the outer ring are constructed so that at least one end surface or face of the inner ring extends beyond the corresponding end surface or face of the outer ring when properly installed so that the extending end surface of the inner ring is against and in contact with the part being secured and thrust from the part is retained by the inner ring, a feature which provides significant advantages explained below. At least one of the axially inclined surfaces of the inner and outer collar rings has a stable anti-friction material thereon to prevent metal-to-metal contact at high static pressure, and the inner and outer rings comply with the conditions set forth above to enable the outer ring to move with respect to the inner ring without the inner ring moving on the shaft.

The loading screw means apply axial force in the direction of inner surface axial inclination, so that the outer ring slides axially with respect to the inner ring and causes the inner ring to contract and grip the shaft. The amount of gripping can be adjusted by adjusting the tightening of the loading screw means to the degree desired. The angle of inclination is very shallow, a few degrees, for example, and the tightening force from the loading screw means is greatly magnified in the radial direction. Thus, a small tightening force will provide a large contraction force on the inner ring and the resulting gripping action on the shaft.

The aforementioned U.S. Pat. No. 3,501,183 discloses several embodiments of thrust retaining devices, but in those embodiments the outer rings retain thrust. In contrast, the inner ring of the present invention retains thrust and thereby provides significant advantages over the thrust retaining devices disclosed in U.S. Pat. No. 3,501,183. The principal advantage is the much higher thrust force it is able to retain. For example, if the angle of inclination is chosen to be about 3° and the anti-friction coating is provided by Teflon, the thrust force which can be retained by the inner collar ring is about 2½ times as great as that which can be retained by the outer collar ring for any given size thrust collar. Also, the present invention provides the possibility of using a single thrust retaining device to provide thrust retention in both axial directions and to use a pair of thrust retaining devices together for double the thrust force retention, both of which are advantages unobtainable by the thrust retaining devices disclosed in U.S. Pat. No. 3,501,183.

BRIEF DESCRIPTION OF THE DRAWINGS

FIG. 1 is an exploded perspective view of one embodiment of the thrust collar of the invention.

FIG. 2 is a sectional view of two embodiments of the thrust collar shown installed for positive axial securing of a part on a smooth shaft.

FIG. 3 is a sectional view of two other embodiments of the thrust collar shown installed for positive axial securing of a part on a smooth shaft.

FIG. 4 is a sectional view of two other embodiments of the thrust collar shown installed for positive axial securing of a part within a smooth bore.

DETAILED DESCRIPTION OF THE PREFERRED EMBODIMENTS

The thrust collar of the invention illustrated in FIG. 1 includes inner collar ring 11, outer collar ring 12, and loading screw means provided by a plurality of screws 13 and matching holes 14 in outer collar ring 12. Inner collar ring 11 is a generally cylindrical shaped ring having an axially straight inner surface 15 and an axially tapered or inclined outer surface 16. In FIG. 1, as well as in the other figures, the angle of inclination is exaggerated for illustration purposes. Inner collar ring 11 may include a slot 17 which makes the ring more flexible or contractible.

Outer collar ring 12 is a generally cylindrical shaped member having an inner surface 18 which is tapered to match the outer surface 16 of inner ring 11. The opening formed by the inner surface 18 of outer ring 12 corresponds to the outer dimensions of inner ring 11 so that inner ring 11 can be nested into the opening of outer ring 12. Thus, the smaller O.D. of inner ring 11 must be smaller than the larger I.D. of outer ring 12, and the larger O.D. of inner ring 11 must be larger than the smaller I.D. of outer ring 12.

At least one, and preferably both, of the tapered or axially inclined surfaces 16 and 18 coated with a dry stable anti-friction material to prevent metal-to-metal contact between the two inclined surfaces 16 and 18. The anti-friction material can be chosen from any of those listed above. The angle of inclination is small, typically from about 2° to about 12°, depending upon the frictional coefficient on the straight surface, and the relationship between the angle of inclination and the coefficients of friction of the inner surface 15 and outer surface 16 of inner ring 11 meets the requirements set forth above.

The loading screw means are preferably provided by a plurality of circumferentially spaced screws 13, which are placed through holes 14 in the outer ring 12 to engage the side of the part to be secured on a shaft or to engage another outer ring. In one embodiment, the outer ring holes 14 are threaded, and the screws 13 are used to jack the outer ring 12 away from the part or from the other ring. In another embodiment, the outer ring holes 14 are drilled or punched, and the screws 13 engage internally threaded holes in the side of the part or in another outer ring to pull the outer ring 12 towards the part or other outer ring. The screws 13 are preferably equally spaced, or at least are spaced to balance loading forces on the outer ring 12.

After placing the inner ring 11 within outer ring 12 to make a snug fit, moderate force can be applied to push the outer ring 12 further axially on inner ring 11, thereby causing the inner ring 12 to radially contract, reducing the size of slot 17. The moderate force is provided by loading screw means in a manner described below.

FIG. 2 illustrates the thrust collar of FIG. 1 properly installed to axially secure a part 19 on a smooth surface of shaft 20. One embodiment of the thrust collar of the invention, shown on the right side of part 19, consists of inner ring 21, outer ring 22, and loading screws 23, which are engaging threaded holes 24 in the side or face of part 19.

The thrust collar is installed by placing inner collar ring 21 over shaft 20 and positioning it at the location on the shaft where desired. The inside diameter of the inner ring 21 is chosen to be close to that of the outer diameter of shaft 20. Outer ring 22 is then slipped over inner ring 21 to provide a snug fit. Or in the alternative, the outer ring 22 and inner ring 21 can be placed together first and then placed on shaft 20. The screws 23 are then placed through drilled holes in outer ring 22 and screwed into threaded holes 24. The end surface or face of part 19 is positioned against one end of inner ring 21, the thicker end in this embodiment. As the screws 23 are tightened, outer ring 22 slides axially on inner ring 21, causing inner ring 21 to contract and grip shaft 20 more tightly. The degree of gripping by inner ring 21 on shaft 20 can be controlled by the degree of tightening the screws 23.

Another embodiment of the invention is illustrated on the left side of the part 19 in FIG. 2, where inner ring 25 is reversed from the embodiment on the right side to have the direction of inclination away from the part 19. Outer ring 26 has threaded holes for the screws 27 to be employed to push against the side or face 25 of part 19 to jack outer ring 26 away from part 19. In this embodiment, the end with the thinner wall of the inner ring 25 is positioned against the side of part 19. While FIG. 2 illustrates thrust collars on both sides of part 19, the invention in its broadest sense requires use of only one thrust collar. Either embodiment illustrated can be employed satisfactorily alone if thrust retention is required in only one direction. The embodiment on the right, however, has the advantage of being able to retain thrust in both axial directions, although the maximum thrust force retained will be much greater in the direction which causes the inner ring 21 to be the thrust retaining member.

The embodiment on the left has the advantage of not requiring threaded holes 24 in the part 19, because it produces a clamping force against the retained part 19.

It should be noted here that the thrust collar of the invention can be employed when the part is positioned against a shoulder on the shaft, in which case, the term "smooth shaft" refers to only the part of the shaft on one side of the part to be secured on the shaft.

Other embodiments of the invention are illustrated in FIG. 3, where a pair of thrust collars are coupled together on each side of part 19 to form thrust retaining devices which can be locked into position on shaft 20 without engaging the part 19 with the screws 30 or 34. On the right side of part 19 a pair of inner rings 29 are placed together with directions of taper inclination of the two being in opposite directions. Screws 30 are threaded through outer ring 31 and engage the side surface of outer ring 32 to jack the two outer rings 31 and 32 apart. In similar manner, a pair of inner rings 33 are positioned on the shaft 20 with the thicker ends against each other and the directions of axial inclination of each being in opposite directions and towards each other. Screws 34 are passed through drilled holes in one outer ring 35 and into threaded holes in the other outer ring 36 to pull the outer rings 35 and 36 towards each other. Either pair of thrust retaining devices can be used alone, on one side of the part 19, if desired.

A variation (not shown) of the embodiments illustrated in FIG. 3 can be provided by placing one of the pair of inner collar rings 29 or 33 on one side of part 19 and the other one on the opposite side. The screws can then be passed through holes drilled all the way through part 19 to engage the outer ring on the other side of part 19. The thrust collars in such an arrangement are then secured on the shaft by either jacking the outer collar rings away from each other or pulling them towards each other, depending upon whether the directions of axial inclination of the tapered surfaces are away from part 19 or towards it, respectively.

A further variation of the invention is illustrated in FIG. 3, where the inner ring 29 closest to part 19 on the right side of part 19 is shown with a bar 37 positioned in the slot of the inner ring and also in a slot in the part 19. Bar 37 secures the part against rotational movement relative to the shaft. This arrangement can be incorporated into other embodiments of the invention.

FIG. 4 illustrates embodiments of the invention adapted to axially secure a part within a smooth bore. In principle, the embodiments are like those described above for use on a shaft, but the roles or functions of the inner and outer rings are reversed. In FIG. 4, the outer ring 40, on the left side of part 38, and the pair of outer rings 43, on the right side, provide the thrust retaining function. They are expandible, and can include a slot like that shown in FIG. 1, so that their outer surfaces grip the inside bore surface of the member 39. Their inner surfaces are axially inclined to match the outer surfaces of inner ring 41 and inner rings 44, respectively.

Inner ring 41 is threaded to permit screws 42 to engage the side or face of part 38 to jack inner ring 41 away from part 38. On the other side of part 38, one outer ring 44 is drilled and the other is threaded to permit screws 45 to pull the two outer rings 44 towards each other. The embodiments described for use within a bore can be varied in similar manner to the embodiments described above for use on a shaft.

The thrust retaining device of the invention can be made from any of a number of materials, but is preferably made from steel because of its high strength and ease of fabrication. It can be produced with conventional machining operations, and is preferably made in a circular shape because of its most common use with round shafts or bores. However, other shapes could be used for certain applications as long as the outer collar ring for use on a shaft and inner collar ring for use inside a bore are of closed cross sectional shape. The collar ring used to retain thrust (the inner for shafts and outer for bores) does not have to be completely closed curved shape, since it can perform its function without completely encircling the shaft or bore, although it is preferable if it does. The thrust retaining ring could also be provided by two or more segments of a ring which are held together as a ring by the mating collar ring. Thus, it can be seen that the term "ring" as used herein is used in a broad sense.

The term "positive axial securing of a part" as used herein means that the thrust force which the thrust collar of the invention can retain is high compared to the thrust force which can be retained by such commonly employed thrust retaining devices as retaining rings and collars which set screws. For example, one embodiment of the thrust collar of the invention can retain forces of 5,900 pounds for a 1 inch diameter shaft, 16,500 pounds for a shaft of 2 inches diameter, and 54,000 pounds for a shaft of 4 inches diameter.

The thrust collar of the invention can be made self releasing in accordance with the teachings set forth in column 8, lines 26 – 63 in the aforementioned U.S. Pat. No. 3,501,183. Self releasing results from the radial force exerted by the deformed inner ring (outer ring in FIG. 4) on the outer ring (inner ring for FIG. 4) having an axial component of force which tends to disengage the outer and inner rings from each other. By providing an angle of axial inclination which is larger than the frictional resistance on the inclined surface, the rings will disengage upon release of the loading screw means. Self releasing provides an important advantage in that the thrust collar can be quickly and easily removed or moved to another position on the shaft.

The thrust collar of the invention can also be used for fixing a shaft to a stationary member. For example, it can be used as a piston lock in a hydraulic cylinder, in which case the piston rod is temporarily secured to the cylinder head wall to prevent premature release of the piston. In this use, the self releasing feature is very desirable, since the piston is locked only temporarily and should be easily releasable to permit the cylinder to be unloaded and the piston retracted. The self releasing feature provides for the possibility of an automatic release of the piston lock. Thus, the term "part" as used herein includes stationary members to which a smooth shaft is secured, as well as moveable parts which are secured to a smooth shaft.

Having described the preferred embodiments of the invention, a number of variations within its scope will be obvious to those skilled in the art.

What is claimed is:

1. A thrust retaining device for positive axial securing of a part on a smooth shaft, comprising:
    a contractible inner collar ring for retaining thrust and having an inner surface for gripping the outer surface of the shaft when contracted, an outer surface which is axially inclined, and an end surface for positioning against the part to be secured;
    an outer collar ring to be placed over and for contracting the inner collar ring, the outer collar ring having an inner surface which is axially inclined at the same angle as the outer surface of the inner collar ring for engaging that surface, the end surface of the inner collar ring extending beyond the outer collar ring when the thrust retaining device is installed on the shaft, at least one of the axially inclined surfaces of the inner and outer collar rings having a stable anti-friction material preventing metal to metal contact thereon, and the inner and outer collar rings complying with following condition:

$$f > \tan(\alpha+\phi)$$

where:
$f$ is the coefficient of starting friction of the inner collar ring on the surface of the shaft,
$\alpha$ is the angle of inclination of the axially inclined surface,
$\phi$ is the frictional angle of the axially inclined surface, the coefficient of starting friction of the axially inclined surface being $\tan \phi$, and
loading screw means attached to the outer collar ring for applying axial force in the direction of the inner surface axial inclination, whereby the outer ring slides relative to the inner ring and causes the inner ring to contract and grip the shaft.

2. The thrust retaining device of claim 1, wherein the inner collar ring is circular.

3. The thrust retaining device of claim 1, wherein the inner collar ring is slotted to make it contractible.

4. The thrust retaining device of claim 3, wherein the slot in the inner ring is adapted to have a bar positioned in the slot, which bar is also positioned in a slot of the part to be secured on the shaft, whereby the thrust collar secures the part against rotational movement relative to the shaft.

5. The thrust retaining device of claim 1, wherein the loading screw means is provided by a plurality of circumferentially spaced screws threaded through the outer ring to engage an end surface of the part to be secured.

6. The thrust retaining device of claim 1, wherein the loading screw means is provided by a plurality of circumferentially spaced screws passing through the outer ring and threaded into the part to be secured.

7. A pair of thrust retaining devices as described in claim 1, wherein the outer surface of each inner collar ring is axially inclined in an opposite direction to the other one when installed on the shaft, and the loading screw means is provided by a plurality of circumferentially spaced screws threaded through one of the outer collar rings and engaging the other outer collar ring to apply axial force to both outer collar rings in the direction of the inner surface axial inclination of both inner collar rings.

8. The pair of thrust retaining devices as described in claim 7, wherein both of the devices when installed on the shaft are adjacent each other on the same side of the part to be secured and only one of the inner collar rings is positioned against the part.

9. The pair of thrust retaining devices as described in claim 7, wherein the thrust retaining device when installed on the shaft are on opposite sides of the part to be secured from each other and both of the inner collar rings are positioned against the part.

10. The thrust retaining device of claim 1, wherein $\alpha$, the angle of inclination of the axially inclined surface, is larger than $\phi$, the frictional angle of the axially inclined surface, to make the thrust retaining device self releasing.

11. A thrust retaining device for positive axial securing of a part within a smooth bore, comprising;
an expandible outer collar ring for retaining thrust and having an outer surface for gripping the inner bore surface when expanded, an inner surface which is axially inclined, and an end surface for positioning against the part to be secured;
an inner collar ring to be placed within and for expanding the outer collar ring, the inner collar ring having an outer surface which is axially inclined at the same angle as the inner surface of the outer collar ring for engaging that surface, the end surface of the outer collar ring extending beyond the inner collar ring when the thrust retaining device is installed on the shaft, at least one of the axially inclined surfaces of the outer and inner collar rings having a stable anti-friction material preventing metal to metal contact thereon, and the outer and inner collar rings complying with the following condition:

$$f > \tan(\alpha+\phi)$$

where:
$f$ is the coefficient of starting friction of the outer collar ring on the surface of the bore,
is the angle of inclination of the axially inclined surface,
$\phi$ is the frictional angle of the axially inclined surface, the coefficient of starting friction of the axially inclined surface being $\tan \phi$, and
loading screw means attached to the inner collar ring for applying axial force in the direction of the outer surface axial inclination, whereby the inner ring slides relative to the outer ring and causes the outer ring to contract and grip the shaft.

* * * * *